(12) United States Patent
Yeh et al.

(10) Patent No.: US 7,684,508 B1
(45) Date of Patent: Mar. 23, 2010

(54) TRANSMISSION DIVERSITY DETECTING APPARATUS CAPABLE OF GENERATING QUALITY INDICATOR AND RELATED METHOD THEREOF

(75) Inventors: Yen-Hui Yeh, Hsin-Chu Hsien (TW); Wei-Nan Sun, Hsin-Chu Hsien (TW)

(73) Assignee: MediaTek Incorporation, Hsin-Chu Hsien (TW)

( * ) Notice: Subject to any disclaimer, the term of this patent is extended or adjusted under 35 U.S.C. 154(b) by 823 days.

(21) Appl. No.: 10/908,829

(22) Filed: May 27, 2005

(51) Int. Cl.
*H04B 7/02* (2006.01)
*H04L 1/02* (2006.01)
*H04L 27/00* (2006.01)

(52) U.S. Cl. ...................... 375/267; 375/259
(58) Field of Classification Search ............... 375/267, 375/260, 259; 704/242
See application file for complete search history.

(56) References Cited

U.S. PATENT DOCUMENTS

| | | | |
|---|---|---|---|
| 6,804,311 B1 | 10/2004 | Dabak et al. | |
| 6,847,810 B2 * | 1/2005 | Shen et al. | 455/277.2 |
| 2001/0006531 A1 * | 7/2001 | Okuyama | 375/130 |
| 2002/0118724 A1 * | 8/2002 | Kishimoto et al. | 375/132 |
| 2002/0136268 A1 * | 9/2002 | Gan et al. | 375/133 |
| 2003/0123530 A1 * | 7/2003 | Maeda et al. | 375/148 |
| 2003/0169703 A1 * | 9/2003 | Tamura | 370/320 |
| 2004/0042536 A1 * | 3/2004 | Rowitch et al. | 375/150 |
| 2004/0203397 A1 * | 10/2004 | Yoon et al. | 455/63.1 |
| 2005/0197080 A1 * | 9/2005 | Ulupinar et al. | 455/135 |
| 2005/0207479 A1 * | 9/2005 | Ruprich et al. | 375/150 |

* cited by examiner

*Primary Examiner*—David C Payne
*Assistant Examiner*—Brian J Stevens
(74) *Attorney, Agent, or Firm*—Winston Hsu

(57) ABSTRACT

The invention relates to a transmission diversity detecting apparatus and method. The transmission diversity detecting apparatus is applied in a Wideband Code-Division Multiple-Access (WCDMA) system having a CIPCH channel and a synchronization channel for detecting an antenna diversity of a cell. The transmission diversity detecting apparatus includes an antenna diversity detecting unit for determining the antenna diversity; and a quality indicator generator, electrically connected to the antenna diversity detecting unit, for generating a quality indicator utilized for indicating the reliability of the antenna diversity determined by the antenna diversity detecting unit.

16 Claims, 5 Drawing Sheets

TRANSMISSION DIVERSITY DETECTING APPARATUS CAPABLE OF GENERATING QUALITY INDICATOR AND RELATED METHOD THEREOF

BACKGROUND

The invention relates to a transmission diversity detecting apparatus and the related method applied to a WCDMA system, and more particularly, to a transmission diversity detecting apparatus capable of generating a quality indicator and the related method thereof.

In WCDMA systems, for registration, an user equipment (UE) must obtain certain system information to camp on a cell. For that purpose, the UE usually provides a cell searcher for getting the system information. Generally, after the UE is powered on, the cell searcher is performed to acquire the timing of the cell and the corresponding scrambling code. However, to read the system information from P-CCPCH, the UE must further detect the antenna diversity of the cell. If the use of antenna diversity is unknown to the UE, the UE might wrongly decode signals from the cell and the decoding performance will degrade significantly.

Please refer to FIG. 1 and FIG. 2. FIG. 1 is the schematic diagram of the synchronization channel (SCH) in the non-TXTD mode. FIG. 2 is the schematic diagram of the SCH in the TXTD mode. As shown in the figures, "a" is a flag showing the transmission diversity of the P-CCPCH channel, "cp" is the primary synchronization code, and "cs" is the secondary synchronization code. It should be noted that the sign of the flag "a" would be different in these two modes. For example, the flag "a" is equal to "−1" when P-CCPCH channel is in non-STTD mode and is equal to "1" when P-CCPCH channel is in STTD mode. It is known that the use of antenna diversity on P-CCPCH channel can be detected from the sign of flag "a". If the sign of the flag "a" is positive, then it is determined to be in Space-Time Transmission Diversity (STTD) mode; otherwise, it is in non-STTD mode. Please note that the use of the transmit diversity on P-CCPCH is independent of the use of the transmit diversity on SCH.

However, in the related art, to detect the antenna diversity, the UE typically needs to estimate the channel response at two antennas of the cell first. That is, the conventional transmission diversity detecting apparatus must perform the channel estimation procedure before determining the flag "a". Please refer to FIG. 3. FIG. 3 is a schematic diagram of the primary common pilot channel (CPICH$_1$) transmitted by antenna 1 and the secondary common pilot channel (CPICH$_2$) transmitted by antenna 2. As shown in FIG. 3, the CPICH$_1$ and CPICH$_2$ are utilized to transmit the pilot symbols that includes the channel information, which could be either "A" or "−A". To detect the signs of the flag "a", it is necessary to use the pilot symbols respectively in CPICH$_1$ and CPICH$_2$ to estimate the channel responses of antenna 1 and antenna 2 first. Once the channel responses of the two antennas are obtained by utilizing these pilot symbols, the related art can further determine the transmission diversity by evaluating the sign of the flag "a".

The operations of estimating the channel responses $h_1(i)$, $h_2(i)$ of the two antennas can be represented by the following equations:

$$h_i(i) = [D_{cp}(i) + D'_{cp}(i)] \cdot \frac{1}{2} \cdot \frac{A^*}{|A|^2} \qquad \text{Equation (1)}$$

$$h_2(i) = (-1)^i \cdot [D_{cp}(i) + D'_{cp}(i)] \cdot \frac{1}{2} \cdot \frac{A^*}{|A|^2} \qquad \text{Equation (2)}$$

In Equation (1) and (2), $D_{cp}(i)$ denotes the first symbol received in the i-th time slot, and $D_{cp}'(i)$ denotes the second symbol received in the i-th time slot.

Since we don't know if the SCH channel is in the TSTD mode, and the channel compensation by the channel estimation result is ambiguous, the detection of the use of the transmission diversity is therefore not guaranteed in the prior art.

SUMMARY

It is therefore one of the objectives of the claimed invention to provide a new method to detect the utilization of the transmission diversity without channel estimation. As a result, the reliability of the detection increases, and the operations of the transmission diversity detecting apparatus are reduced accordingly.

Additionally, another objective of the claimed invention is to provide a quality indicator utilized to determine the confidence of the diversity detection.

According to the claimed invention, a transmission diversity detecting apparatus is disclosed. The transmission diversity detecting apparatus is utilized for detecting an antenna diversity of a cell, and is applied in a WCDMA system having a CIPCH channel and a synchronization channel. The transmission diversity detecting apparatus comprises: a common pilot channel (CPICH) despreader for de-spreading a signal received from the cell according to a scrambling code to generate a plurality of CPICH symbols; a synchronization channel (SCH) despreader for de-spreading the signal received from the cell according to a synchronization code to generate a plurality of SCH symbols; a correlator, electrically connected to the CPICH despreader and the SCH despreader, for generating a plurality of correlation values according to the CPICH symbols and the SCH symbols; and a decision module, coupled to the multiplication unit, for determining the antenna diversity according to the correlation values.

According to the claimed invention, a transmission diversity detecting apparatus is disclosed. The transmission diversity detecting apparatus is utilized for detecting an antenna diversity of a cell, and is applied in a WCDMA system having a CIPCH channel and a synchronization channel. The transmission diversity detecting apparatus comprises: an antenna diversity detecting unit for determining the antenna diversity; and a quality indicator generator, electrically connected to the antenna diversity detecting unit, for generating a quality indicator utilized for indicating the reliability of the antenna diversity determined by the antenna diversity detecting unit.

According to the claimed invention, a transmission diversity detecting method is disclosed. The transmission diversity detecting method is utilized for detecting an antenna diversity of a cell, and is applied in a WCDMA system having a CIPCH channel and a synchronization channel. The transmission diversity detecting method comprises: (a) de-spreading a signal received from the cell according to a scrambling code to generate a plurality of CPICH symbols; (b) de-spreading the signal received from the cell according to a synchronization code to generate a plurality of SCH symbols; (c) generating a plurality of correlation values according to the CPICH symbols and the SCH symbols; and (d) determining the antenna diversity according to the correlation values.

According to the claimed invention, a transmission diversity detecting method is disclosed. The transmission diversity detecting method is utilized for detecting an antenna diversity of a cell and is applied in a WCDMA system having a CIPCH channel and a synchronization channel. The transmission diversity detecting method comprising: (r) determining the antenna diversity; and (s) generating a quality indicator utilized for indicating the reliability of the antenna diversity determined by the antenna diversity detecting unit.

According to the present invention, it is not necessary to estimate the separated channel response of the two antennas of the cell and the detection of flag 'a' is not implemented by direct compensation of synchronization channel correlation result by separated channel response. As a result, the ambiguity caused by the unknown of SCH diversity mode can be eliminated, and the complexity of the transmission diversity detecting method is reduced at the same time.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
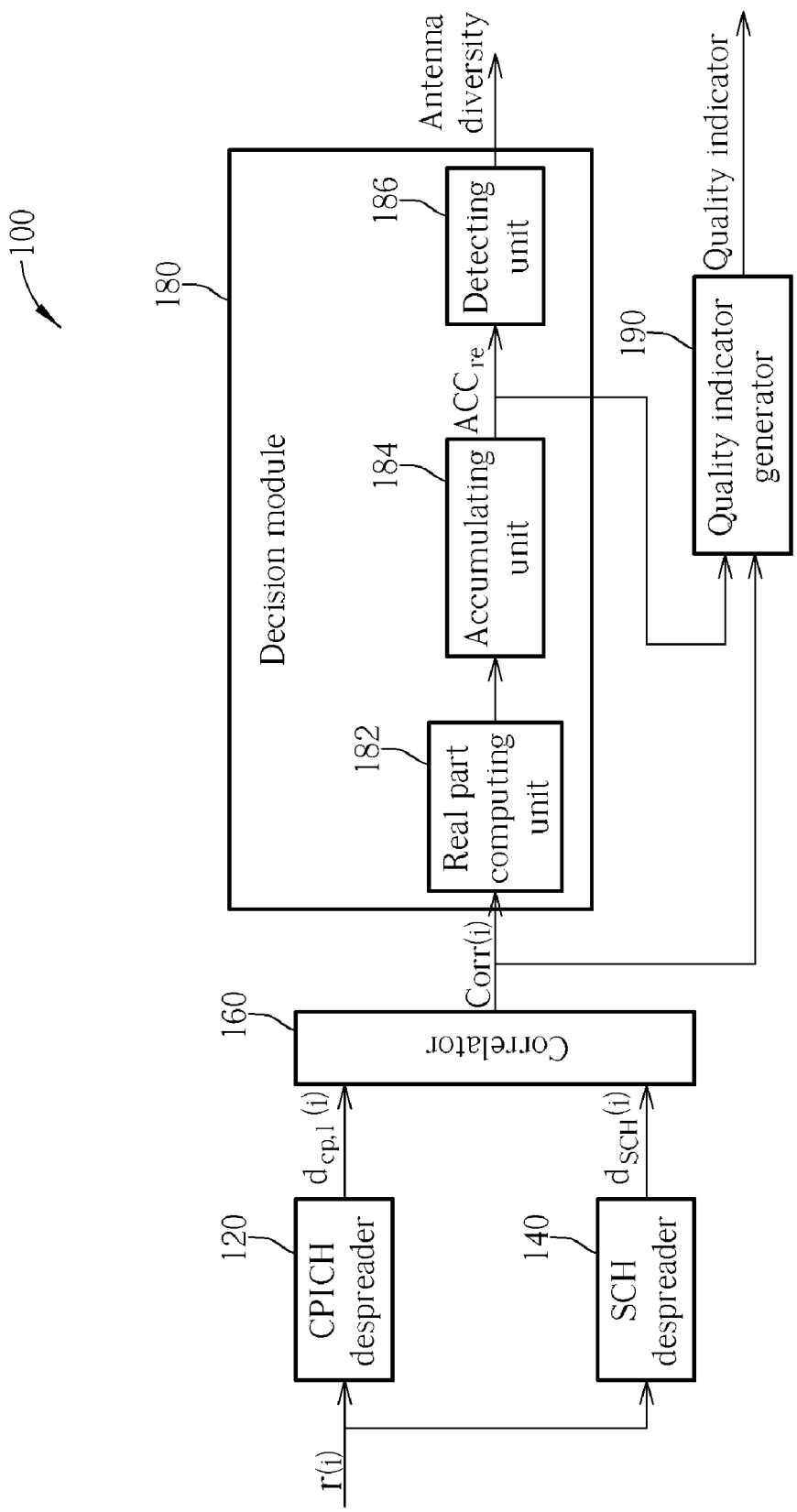
FIG. 4 is a schematic diagram of the transmission diversity detecting apparatus according to a preferred embodiment.

Please refer to FIG. 4. FIG. 4 is a schematic diagram of a preferred embodiment of the transmission diversity detecting apparatus 100 according to the present invention. In the present invention, by detecting the flag "a", the use of antenna diversity can be identified. Here, both the synchronization channel (SCH) and the common pilot channel (CPICH) are used to detect the transmission diversity. The synchronization channel (SCH) may include a primary synchronization code and a secondary synchronization code. It should be noted that since the primary and the second synchronization codes are transmitted in the same scheme, either synchronization code could be used in the present invention to detect the flag "a". The transmission diversity detecting apparatus 100 comprises a common pilot channel (CPICH) despreader 120, a synchronization channel (SCH) despreader 140, a correlator 160, a decision module 180, and a quality indicator generator 190.

Figure 1:
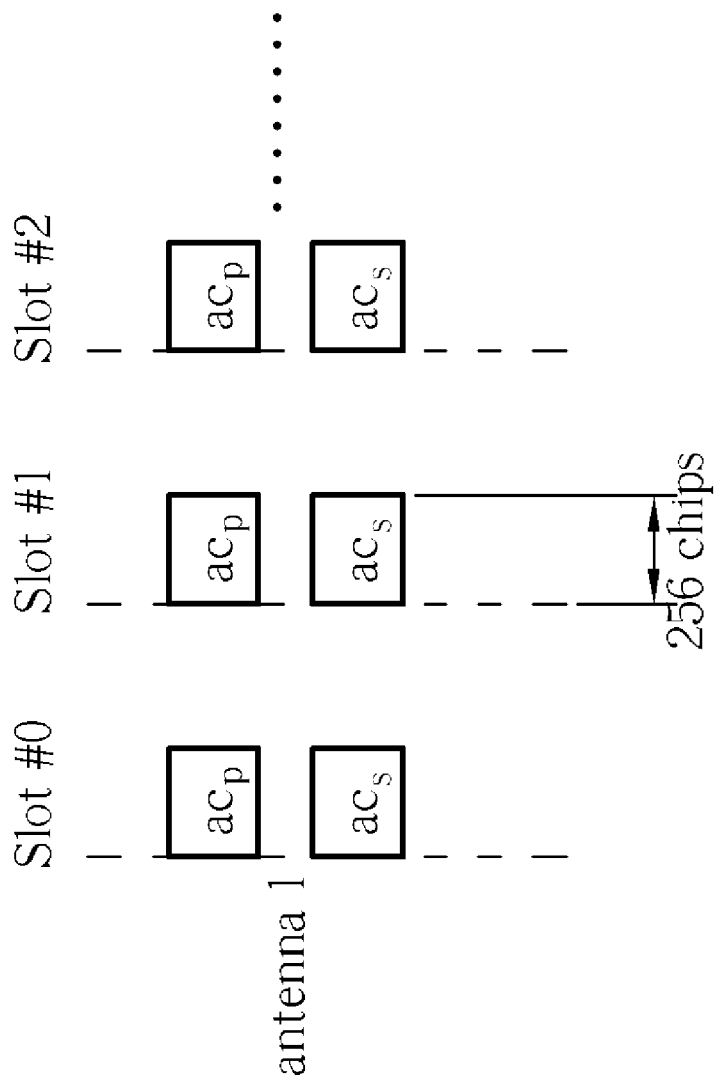
FIG. 1 is the schematic diagram of the synchronization channel in the non-TXTD mode.
Figure 2:
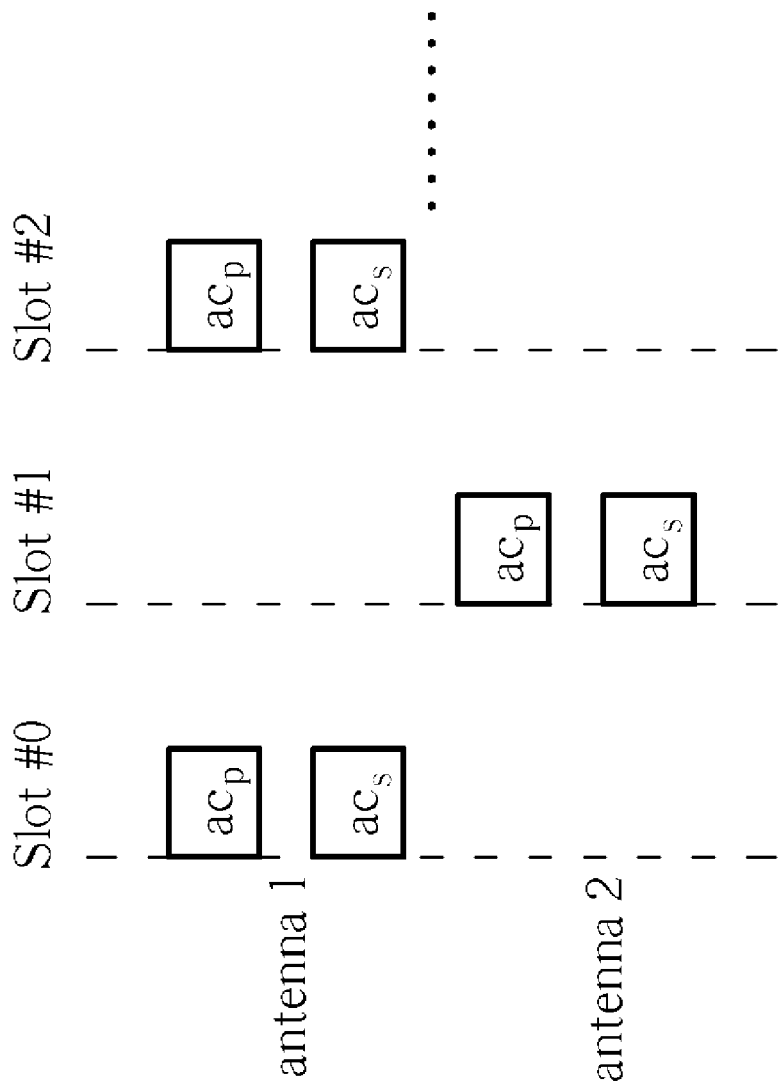
FIG. 2 is the schematic diagram of the SCH in the TXTD mode.
Figure 3:
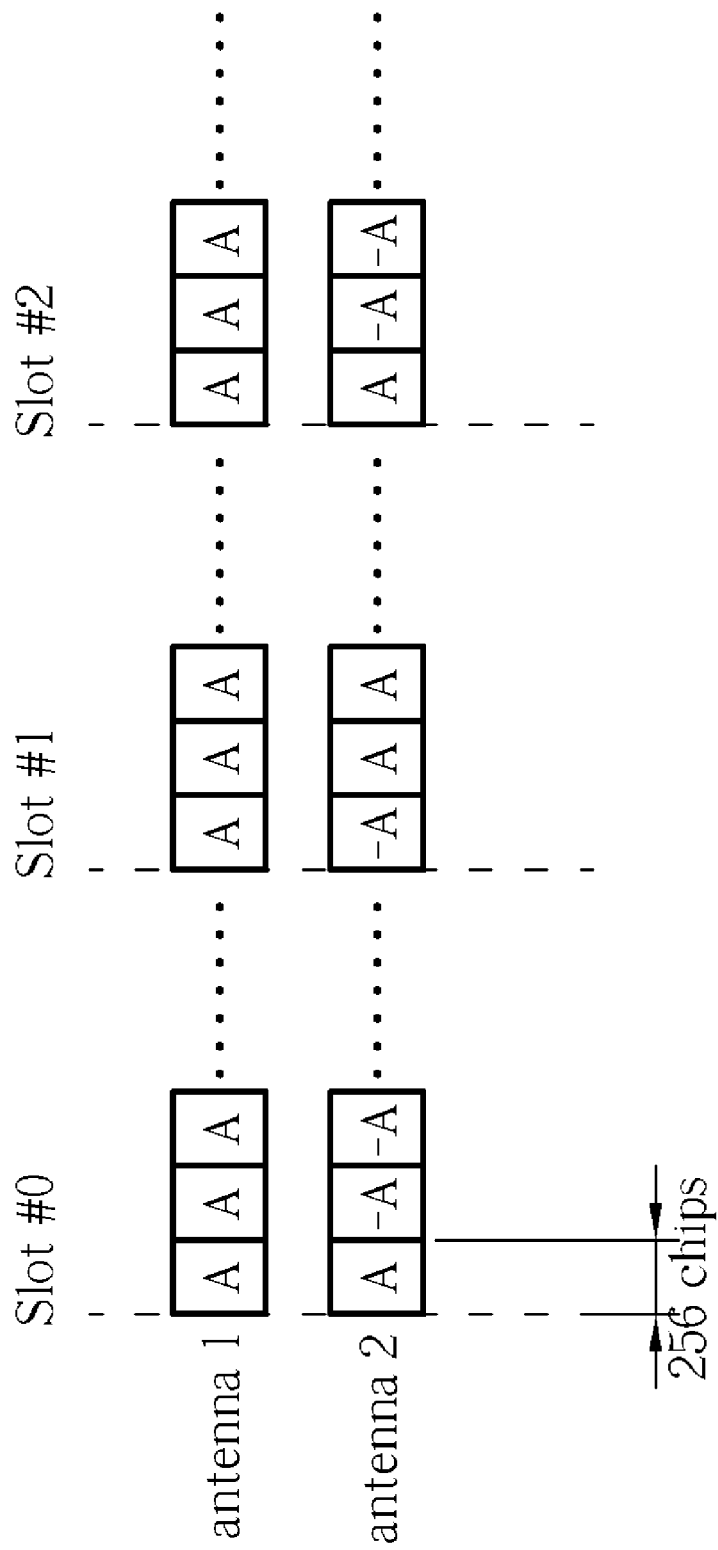
FIG. 3 is a schematic diagram of the primary common pilot channel where the transmitted pilot patterns on both antennas are shown.

The CPICH despreader 120 de-spreads a signal r(i) received from the cell according to a predetermined scrambling code to generate a plurality of CPICH symbols $d_{cp,L}(i)$. Please note that $d_{cp,L}(i)$ denote the L-th CPICH de-spread symbol in slot i. For example, $d_{cp,0}(0)$ in FIG. 3 corresponds to "A" and "−A" pilot symbol from transmitter (i.e., the 0-th pilot symbol CPICH$_1$ on antenna 1 and the 0-th pilot symbol CPICH$_2$ on antenna 2 in slot 0), and $d_{cp,1}(0)$ corresponds to "A" and "−A" pilot symbol from transmitter (i.e., the first pilot symbol CPICH$_1$ on antenna 1 and the first pilot symbol CPICH$_2$ on antenna 2 in slot 0). In the preferred embodiment, taking the CPICH symbol $d_{cp,1}(i)$ for example, the first symbols in each slot are utilized, and the mathematic model of the first CPICH symbol $d_{cp,1}(i)$ received by the user equipment in each time slot is expressed as the following equation:

$$d_{cp,1}(i) = \begin{cases} h_1(i) - h_2(i) + I_{cp}(i) & i \text{ is even} \\ h_1(i) + h_2(i) + I_{cp}(i) & i \text{ is odd} \end{cases} \quad \text{Equation (3)}$$

where $h_1(i)$ and $h_2(i)$ are the actual channel responses for the two antenna in slot 1, and $I_{cp}(i)$ is the interference term. In this case we consider that the CPICH is in STTD mode. When CPICH is in non-STTD mode, the mathematic model can be obtained by Equation (3) with $h_2(i)$ ignored.

The SCH despreader 140 de-spreads the signal r(i) according to a synchronization code to generate a plurality of SCH symbols $d_{SCH}(i)$. The mathematic model of the SCH symbol $d_{SCH}(i)$ received by the user equipment is expressed as the following equation:

$$d_{SCH}(i) = \begin{cases} ah_1(i) + I_1(i) & i \text{ is even} \\ ah_2(i) + I_2(i) & i \text{ is odd} \end{cases} \quad TSTD \text{ on} \quad \text{Equation (4)}$$

$$d_{SCH}(i) = ah_1(i) + I_1(i) \quad TSTD \text{ off}$$

wherein $I_1$ denotes the interference of antenna 1, and $I_2$ denotes the interference of antenna 2. Please note that if the Time Switched transmission diversity (TSTD) mode is on, the CPICH channel will be in STTD mode.

The correlator 160 calculates a plurality of correlation values Corr(i) of the first CPICH symbols and the SCH symbols in each time slot. If the SCH is in the TSTD mode, the mathematic model of the correlation value Corr(i) is expressed as the following equation:

$$\text{Corr}(i) = \quad \text{Equation (5)}$$

$$d_{cp,1}(i)d^*_{SCH}(i) = \begin{cases} a|h_1(i)|^2 - ah_1^*(i)h_2(i) + I'(i) & i \text{ is even} \\ a|h_2(i)|^2 - ah_1(i)h_2^*(i) + I'(i) & i \text{ is odd} \end{cases}$$

wherein I' denotes the interference. When SCH is not in the TSTD mode, the CPICH channel can be either in STTD mode or in non-STTD mode. If the CPICH is not in the STTD mode, the mathematic model of the correlation value Corr(i) is expressed as the following equation:

$$\text{Corr}(i) = d_{cp,1}(i)d^*_{SCH}(i) = \begin{cases} a|h_1(i)|^2 + I'(i) & i \text{ is even} \\ a|h_1(i)|^2 + I'(i) & i \text{ is odd} \end{cases} \quad \text{Equation (6)}$$

On the other hand, if CPICH is in the STTD mode, the correlation value Corr(i) is expressed as the following equation:

$$\text{Corr}(i) = \quad \text{Equation (7)}$$

-continued $$d_{cp,1}(i)d^*_{SCH}(i) = \begin{cases} a|h_1(i)|^2 - ah_1^*(i)h_2(i) + I'(i) & i \text{ is even} \\ a|h_1(i)|^2 - ah_1(i)h_2^*(i) + I'(i) & i \text{ is odd} \end{cases}$$

It should be noted that the channel gain is assumed the same between the 0-th and the first CPICH symbols, so that the SCH symbol and the first CPICH symbol in the same slot suffer the same channel fluctuation. However, it should be also noted that the present invention is not limited to utilize the first CPICH symbols. With similar characteristic, any other symbols in the slot may be used in the present invention.

The decision module 180 determines the antenna diversity according to the correlation values Corr(i). The decision module 180 comprises a real part computing unit 182, an accumulating unit 184, and a detecting unit 186. The real part computing unit 182 generates the real part of the correlation value Corr(i) according to the preferred embodiment. The accumulating unit 184 generates an accumulating value $ACC_{re}$ by accumulating the real parts of the correlation values Corr(i). Assuming the channel gains of two adjacent time slots are the same, the accumulating value $ACC_{re}$ can be expressed as the following equation:

$$ACC = \sum_{i=0}^{2N-1} \text{Corr}(i) = \sum_{i=0}^{N-1} [\text{Corr}(2i) + \text{Corr}(2i+1)] \quad \text{Equation (8)}$$

$$= \sum_{i=0}^{N} [a(|h_1(2i)|^2 + |h_2(2i+1)|^2) - ah_1^*(2i)h_2(2i) +$$

$$ah_1(2i+1)h_2^*(2i+1) + I'(2i) + I'(2i+1)]$$

$$= \sum_{i=0}^{N-1} [a(|h_1(2i)|^2 + |h_2(2i+1)|^2) + j\text{Im}\{ah_1^*(2i)h_2(2i)\} +$$

$$I'(2i) + I'(2i+1)]$$

$$\Rightarrow \text{Re}\{ACC\} = ACC_{re} =$$

$$\sum_{i=0}^{N-1} [a(|h_1(2i)|^2 + |h_2(2i+1)|^2) + \text{Re}\{I'(2i) + I'(2i+1)\}]$$

The mathematic module of the accumulating value $ACC_{re}$ shown in Equation (8) can be utilized not only in TXTD mode, but also in non-TXTD mode. Please note that the number of the accumulated correlation values Corr(i) is even according to the Equation (8) for simplifying the accumulating value $ACC_{re}$. Besides, the interferences are neutralized by each other according to Equation (8). As more correlating correlation values Corr(i) are accumulated, less interference is contained by the accumulating value $ACC_{re}$. As a result, by detecting the sign of the accumulating value $ACC_{re}$, it is able to detect the sign of the flag "a" so as to identify the use of antenna diversity. If the accumulating value $ACC_{re}$ is positive and greater than an upper threshold value, the detecting unit 186 determines the P-CCPCH is in the TXTD mode (i.e., the cell utilizes two antennas to transmit P-CCPCH). In the same manner, if the accumulating value $ACC_{re}$ is negative and smaller than a lower threshold value, the detecting unit 186 determines the P-CCPCH is in the non-TXTD mode (i.e., the cell only utilizes one antenna to transmit P-CCPCH).

Please note that the upper and lower threshold values can be "0.8" and "−0.8" according the preferred embodiment of the transmission diversity detecting apparatus 100. If the accumulating value $ACC_{re}$ is between the upper and lower threshold values then the reliability of the detection might not be good enough. In this case, the transmission diversity detecting apparatus 100 might re-calculate the accumulating value $ACC_{re}$ to make sure the detection of the antenna diversity. According to another embodiment of the transmission diversity detecting apparatus 100, the upper and lower threshold values mentioned above are both zero. Since if the flag "a" can be detected, the use of antenna diversity on P-CCPCH can be identified. Therefore, in this embodiment, if the accumulating value $ACC_{re}$ is positive, the flag "a" is determined to be "1", otherwise, the flag "a" is determined to be "−1". As a result, the algorithm utilized by the detecting unit 186 is simplified according to the embodiment.

Please note that the location of the real part computing unit 182 is not limited to the preferred embodiment. For example, the real part computing unit 182 can be operated after the accumulating unit 184 (i.e. The computing unit 182 can be placed behind the accumulating unit 184).

Figure 5:
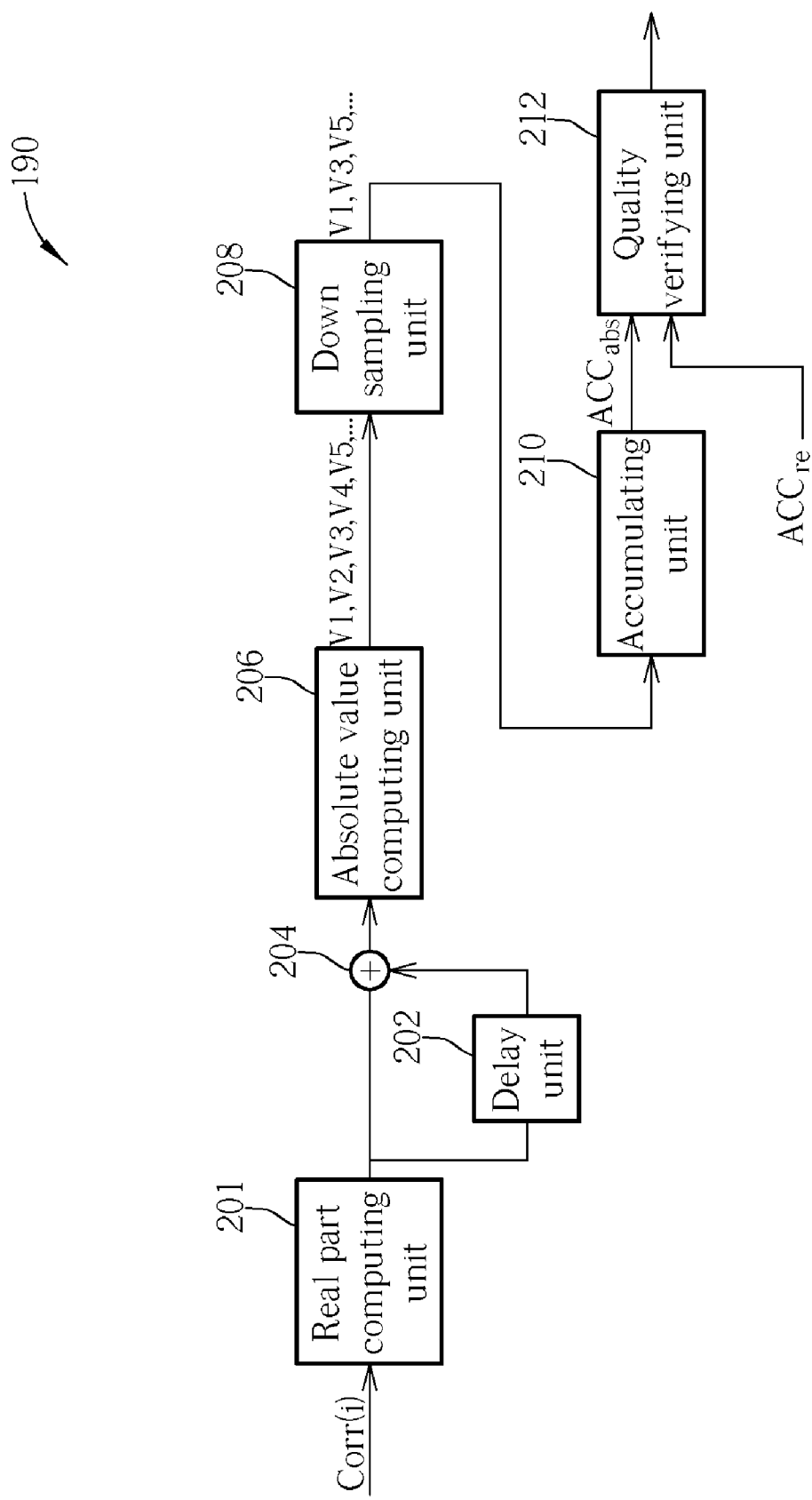
FIG. 5 is a schematic diagram of a quality indicator generator shown in FIG. 4 according to the preferred embodiment.

Please refer to FIG. 5, FIG. 5 is a schematic diagram of a quality indicator generator 190 shown in FIG. 4 according to the preferred embodiment. The quality indicator generator 190 is utilized for indicating the reliability of the antenna diversity determined by the detecting unit 186 shown in FIG. 4. According to the preferred embodiment, the quality indicator generator 190 comprises a real part computing unit 201, a delay unit 202, an adder 204, an absolute value computing unit 206, a down-sampling unit 208, an accumulating unit 210, and a quality verifying unit 212. The real part computing unit 201 generates a plurality of first computing values equal to the real parts of the correlation values. In some embodiments, the real part computing unit 201 is actually the real part computing unit 182. The delay unit 202 generates a plurality of delayed values of the computing values, respectively. The adder 204 adds the output of the delay unit 202 to the output of the real part computing unit 201 to generate a plurality of second computing values V1, V2, V3, V4, V5 (V1=Re[Corr(0)]+Re[Corr(1)], V2=Re[Corr(1)]+Re[Corr(2)], V3=Re[Corr(2)]+Re[Corr(3)], V4=Re[Corr(3)]+Re[Corr(4)], V5=Re[Corr(4)]+Re[Corr(5)]), etc. The down-sampling unit 208 down-samples the inputted second computing values V1, V2, V3, V4, V5 . . . etc to only output odd ones of the second computing values V1, V3, V5 . . . etc. The absolute value computing unit 206 generates a plurality of absolute values of the output of the down-sampling unit 208. The accumulating unit 210 generates an accumulating value $ACC_{abs}$ by accumulating the outputs of the down-sampling unit 208. The operation of the delay unit 202, the adder 204, the absolute value computing unit 206, the down-sampling unit 208, and the accumulating unit 210 can be expressed as the following equation:

$$ACC_{abs} = \sum_{i=0}^{N-1} |\text{Re}\{\text{Corr}(2i)\} + \text{Re}\{\text{Corr}(2i+1)\}| \quad \text{Equation (9)}$$

$$= \sum_{i=0}^{N-1} |a(|h_1(2i)|^2 + |h_1(2i+1)|^2) +$$

$$\text{Re}\{I'(2i)\} + \text{Re}\{I'(2i-1)\}|$$

Compare with the accumulating value $ACC_{re}$ generated by accumulating the correlation values Corr(i) coherently, the accumulating value $ACC_{abs}$ is generated by accumulating the absolute value of the sum of two adjacent correlation values. As a result, the accumulating value $ACC_{abs}$ is a non-coherent accumulating result, and the accumulating value $ACC_{re}$ is a coherent accumulating result.

It is mentioned that the more correlating correlation values Corr(i) are accumulated, the more interference contained by the accumulating value $ACC_{re}$ is reduced. According to the Equation (8), however, the more correlation values that Corr(i) accumulates, the greater the interference is contained in the accumulating value $ACC_{abs}$ according to the Equation (9). Therefore, the quality verifying unit 212 compares the accumulating value $ACC_{re}$ to $ACC_{abs}$ to determined the magnitude of interference suffered by the antenna diversity detecting apparatus 100. The reliability of the detecting result of the antenna diversity detecting apparatus 100 deteriorates as interference increases. According to the preferred embodiment, the quality verifying unit 212 generates the quality indicator according to the ratio of the accumulating value $ACC_{re}$ and the accumulating value $ACC_{abs}$. As the quality indicator becomes greater, then the detection of the detecting unit 186 is more reliable. If the quality indicator is lower than a threshold value, the transmission diversity detecting apparatus 100 will re-detect the transmission diversity. Otherwise, the detected transmission diversity is determined to be a correct result.

Compared with the related art, with the present invention, it is not necessary to estimate the separated channel responses of the two antennas of the cell and it does not need to know if the SCH is in TSTD mode. Therefore, the ambiguity caused by the unknown of the SCH diversity mode can be eliminated, and the complexity detecting method is reduced at the same time. Additionally, the antenna diversity detecting apparatus and method also provide a quality indicator generator and the related method according to the present invention for generating the quality indicator indicating the reliability of the detecting result.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transmission diversity detecting apparatus applied in a Wideband Code-division multiple-access (WCDMA) system having a CIPCH channel and a synchronization channel for detecting an antenna diversity of a cell, the transmission diversity detecting apparatus comprising:
    a common pilot channel (CPICH) despreader for de-spreading a signal received from the cell according to a scrambling code to generate a plurality of CPICH symbols;
    a synchronization channel (SCH) despreader for de-spreading the signal received from the cell according to a synchronization code to generate a plurality of SCH symbols;
    a correlator, electrically connected to the CPICH despreader and the SCH despreader, for generating a plurality of correlation values according to the CPICH symbols and the SCH symbols;
    a decision module, coupled to the multiplication unit, for determining the antenna diversity only according to the correlation values, wherein the decision module comprises:
        a first accumulating unit, electrically connected to the correlator, for generating a first accumulating value according to the correlation values over N time slots; and
        a detecting unit, coupled to the first accumulating unit, for determining the antenna diversity according to the first accumulating value; and
    a quality indicator generator, electrically connected to the correlator, for generating a quality indicator according to the correlation values, wherein the quality indicator is used for indicating the reliability of the antenna diversity determined by the detecting unit, and the quality indicator generator comprises:
        a delay unit, electrically connected to the correlator, for generating a plurality of delayed values according to the correlation values, respectively;
        an adder, electrically connected to the correlator and the delay unit, for generating a plurality of first computing values according to outputs of the delay unit and outputs of the computing unit;
        an absolute value computing unit, coupled to the adder, for generating a plurality of absolute values of the first computing values;
        a second accumulating unit, electrically connected to the absolute value computing unit, for generating a second accumulating value derived from absolute values; and
        a quality verifying unit, electrically connected to the first accumulating unit and the second accumulating unit, for generating the quality indicator according to the first accumulating value and the second accumulating value.

2. The transmission diversity detecting apparatus of claim 1, wherein the correlation values are real parts of every correlation of the CPICH symbol and the SCH symbol in each time slot.

3. The transmission diversity detecting apparatus of claim 1, wherein the first accumulating value is the real part of the sum of the correlation values.

4. The transmission diversity detecting apparatus of claim 1, wherein the detecting unit determines the antenna diversity by checking the sign of the first accumulating value.

5. The transmission diversity detecting apparatus of claim 1, wherein the CPICH symbol is the second CPICH symbol of the CPICH symbols in each slot.

6. The transmission diversity detecting apparatus of claim 1, wherein N is an even integer.

7. The transmission diversity detecting apparatus of claim 1, wherein if the first accumulating value is negative, the detecting unit determines that the antenna diversity corresponds to a TXTD mode; otherwise, the detecting unit determines that the antenna diversity corresponds to a non-TXTD mode.

8. A transmission diversity detecting method applied in a Wideband Code-division multiple-access (WCDMA) system having a CIPCH channel and a SCH channel for detecting an antenna diversity of a cell, the transmission diversity detecting method comprising:
    (a) de-spreading a signal received from the cell according to a scrambling code to generate a plurality of CPICH symbols;
    (b) de-spreading the signal received from the cell according to a synchronization code to generate a plurality of SCH symbols;
    (c) utilizing a correlator to generate a plurality of correlation values according to the CPICH symbols and the SCH symbols; and
    (d) utilizing a decision module to determine the antenna diversity according to the correlation values, comprising:
    (e) generating a first accumulating value according to the correlation values over N time slots; and
    (f) determining the antenna diversity according to the first accumulating value; and
    (g) generating a quality indicator according to the correlation values, comprising:

generating a plurality of delayed values according to the correlation values, respectively;

generating a plurality of first computing values according to the correlation values and the delayed values;

generating a plurality of absolute values of the first computing values;

generating a second accumulating value derived from the absolute values; and generating the quality indicator according to the first accumulating value and the second accumulating value, wherein the quality indicator is used for indicating the reliability of the antenna diversity determined by the step (f).

9. The transmission diversity detecting method of claim 8, wherein the correlation values are real parts of every correlation of a CPICH symbol and a SCH symbol in each time slot.

10. The transmission diversity detecting method of claim 8, wherein the first accumulating value is the real part of the sum of the correlation values.

11. The transmission diversity detecting method of claim 8, wherein the step (f) comprises determining the antenna diversity by checking the sign of the first accumulating value.

12. The transmission diversity detecting method of claim 8, wherein the CPICH symbol is the second CPICH symbol of the CPICH symbols in each slot.

13. The transmission diversity detecting method of claim 8, wherein N is an even integer.

14. The transmission diversity detecting method of claim 8, wherein if the first accumulating value is negative, the antenna diversity is determined to be a TXTD mode; otherwise, the antenna diversity is determined to be a non-TXTD mode.

15. A transmission diversity detecting apparatus applied in a Wideband Code-division multiple-access (WCDMA) system having a CIPCH channel and a synchronization channel for detecting an antenna diversity of a cell, the transmission diversity detecting apparatus comprising:

a common pilot channel (CPICH) despreader for de-spreading a signal received from the cell according to a scrambling code to generate a plurality of CPICH symbols;

a synchronization channel (SCH) despreader for de-spreading the signal received from the cell according to a synchronization code to generate a plurality of SCH symbols;

a correlator, electrically connected to the CPICH despreader and the SCH despreader, for generating a plurality of correlation values according to the CPICH symbols and the SCH symbols;

a decision module, coupled to the multiplication unit, for determining the antenna diversity only according to the correlation values, wherein the decision module comprises:

a first accumulating unit, electrically connected to the correlator, for generating a first accumulating value according to the correlation values over N time slots; and a detecting unit, coupled to the first accumulating unit, for determining the antenna diversity according to the first accumulating value; and a quality indicator generator, electrically connected to the correlator, for generating a quality indicator according to the correlation values, wherein the quality indicator is used for indicating the reliability of the antenna diversity determined by the detecting unit, the quality indicator generator separately calculates a coherent accumulation result of the correlation values and a non-coherent accumulation result of the correlation values, and the quality indicator is the ratio of the coherent accumulation result to the non-coherent accumulation result.

16. A transmission diversity detecting method applied in a Wideband Code-division multiple-access (WCDMA) system having a CIPCH channel and a SCH channel for detecting an antenna diversity of a cell, the transmission diversity detecting method comprising:

(a) de-spreading a signal received from the cell according to a scrambling code to generate a plurality of CPICH symbols;

(b) de-spreading the signal received from the cell according to a synchronization code to generate a plurality of SCH symbols;

(c) utilizing a correlator to generate a plurality of correlation values according to the CPICH symbols and the SCH symbols;

(d) utilizing a decision module to determine the antenna diversity according to the correlation values, comprising:

(e) generating a first accumulating value according to the correlation values over N time slots; and (f) determining the antenna diversity according to the first accumulating value; and (g) generating a quality indicator according to the correlation values, comprising:

(h) calculating a coherent accumulation result of the correlation values;

(i) calculating a non-coherent accumulation result of the correlation values; and (j) generating the quality indicator corresponding to the ratio of the coherent accumulation result to the non-coherent accumulation result, wherein the quality indicator is used for indicating the reliability of the antenna diversity determined by the step (I).

* * * * *